Patented Nov. 18, 1930

1,781,830

UNITED STATES PATENT OFFICE

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN

PROCESS FOR FIXING OR RECOVERING CHLORINE

No Drawing.    Application filed October 30, 1926.  Serial No. 145,374.

This invention relates more particularly to the fixing or recovery of chlorine, and it is among the objects of the invention to provide a process which is effective and yet not unduly expensive. Other objects and advantages will appear as the description proceeds.

To the accomplishment of the foregoing and related ends, the invention, then, consists of the features hereinafter fully described, and particularly pointed out in the claims, the following description setting forth in detail but one of the various modes in which the principle of the invention may be applied.

As an illustration of the invention, the process will be described with reference to the handling of chlorine from molten bath electrolysis, this presenting rather exacting and extreme conditions. In electrolysis of molten chlorides of high melting point, e. g., sodium chloride, magnesium chloride, etc., chlorine gas of very high temperature is given off. It is very difficult to make electrolytic cells of this class sufficiently tight over the anode compartment to allow delivery of a concentrated gas stream, and I prefer to provide a suction flue and draw off the chlorine, allowing air leakage in sufficient amount to cool the chlorine. In this manner the gas can be directly reduced in temperature, and is so dilute as to be readily handled in flues of cheap construction. I now mingle with the chlorine a controlled stream of sulphur dioxide gas and treat with water, for example by passing the gases through a water scrubber or the like. The water is broken up, for instance as illustrated in the equation:

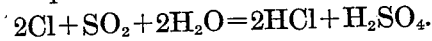

$2Cl + SO_2 + 2H_2O = 2HCl + H_2SO_4.$

A solution of hydrochloric and sulphuric acids is formed. By recycling the acid liquor through the scrubbers any inequality in ratio of sulphur dioxide and chlorine may be averaged down and the escape of either gas from the system substantially prevented. The acids may be finally neutralized with waste alkali or lime, or may be utilized in any other manner preferred. A marked advantage of this process lies in the fact that changes in the amounts of air handled make no difference for ordinary ranges, and the feed of sulphur dioxide can be practically controlled to the proportion desired for the chlorine being treated.

Other modes of applying the principle of the invention may be employed, change being made as regards the details disclosed, provided the step or steps stated by any of the following claims or the equivalent of such be employed.

I therefore particularly point out and distinctly claim as my invention:—

1. In a method of controlling reaction where electrolyzing compounds yielding a gas at elevated temperature, the steps which comprise exhausting such gas while admitting air thereinto and treating the resulting mixture with an agent for selectively retaining the gas.

2. In a method of controlling chlorine where electrolyzing fused compounds yielding a metal and a gas at elevated temperature, the steps which comprise exhausting such chlorine while admitting air thereinto and treating the resulting mixture with an agent for selectively retaining the chlorine.

3. In a method of electrolyzing compounds yielding chlorine gas at elevated temperature, the steps which comprise exhausting the hot chlorine while admitting air thereinto, further admixing sulphur dioxide, and subjecting the mixed gases to the action of water.

Signed by me this 22nd day of October, 1926.

EDWIN O. BARSTOW.